(12) United States Patent
Jaeger

(10) Patent No.: US 8,955,187 B2
(45) Date of Patent: Feb. 17, 2015

(54) CLEANING APPARATUS

(76) Inventor: Anton Jaeger, Senden (DE)

(*) Notice: Subject to any disclaimer, the term of this patent is extended or adjusted under 35 U.S.C. 154(b) by 894 days.

(21) Appl. No.: 13/091,240

(22) Filed: Apr. 21, 2011

(65) Prior Publication Data

US 2011/0259364 A1 Oct. 27, 2011

(30) Foreign Application Priority Data

Apr. 23, 2010 (DE) .......................... 10 2010 018 011

(51) Int. Cl.
- *A46B 13/06* (2006.01)
- *B08B 1/04* (2006.01)
- *A46B 11/06* (2006.01)
- *A46B 13/00* (2006.01)
- *B08B 3/02* (2006.01)
- *B08B 3/04* (2006.01)
- *F24J 2/46* (2006.01)

(52) U.S. Cl.
CPC ................. *B08B 1/04* (2013.01); *A46B 11/063* (2013.01); *A46B 13/001* (2013.01); *A46B 13/06* (2013.01); *B08B 3/02* (2013.01); *B08B 3/024* (2013.01); *B08B 3/04* (2013.01); *B08B 3/041* (2013.01); *F24J 2/461* (2013.01); *A46B 2200/3073* (2013.01); *Y02B 10/20* (2013.01); *Y02E 10/40* (2013.01)
USPC ...... 15/24; 15/23; 15/22.1; 15/21.1; 15/103.5

(58) Field of Classification Search
USPC .................................. 15/21.1, 23, 24, 103.5
See application file for complete search history.

(56) References Cited

U.S. PATENT DOCUMENTS

| | | | |
|---|---|---|---|
| 1,951,273 A | 3/1934 | Dalgleish | |
| 4,597,127 A * | 7/1986 | Swanson | 15/24 |
| 5,987,682 A * | 11/1999 | Rossi | 15/24 |
| 6,862,769 B1 | 3/2005 | Dalton, Sr. | |

FOREIGN PATENT DOCUMENTS

| | | |
|---|---|---|
| CH | 4 59 143 | 7/1968 |
| DE | 19 58 872 | 9/1970 |
| DE | 34 17 913 A1 | 11/1985 |
| DE | 196 53 697 C1 | 4/1998 |
| DE | 199 09 992 C1 | 10/2000 |
| DE | 20 2006 013 463 U1 | 1/2007 |
| DE | 20 2009 008001 U1 | 10/2009 |
| EP | 0 870 461 A1 | 4/1998 |
| WO | WO 93/24717 * | 9/1993 |
| WO | WO-93/24717 A1 | 12/1993 |

OTHER PUBLICATIONS

Translation of German Search Report dated Jan. 5, 2011. DE 10 2010 018 011.4.
Translation of European Search Report dated Oct. 4, 2011. EP 11003387.5.

* cited by examiner

*Primary Examiner* — Saeed T Chaudhry
(74) *Attorney, Agent, or Firm* — Gifford, Krass, Sprinkle, Anderson & Citkowski, P.C.

(57) ABSTRACT

The invention relates to a cleaning apparatus, in particular for cleaning solar installation surfaces or photovoltaic installation surfaces, comprising a carrier, at least one cleaning roller rotatably supported at the carrier, and a rotary drive for the cleaning roller, wherein the rotary drive is designed as a fluid drive, wherein the flow of a cleaning fluid supplied to the cleaning roller for cleaning purposes is converted into a drive movement for the cleaning roller.

13 Claims, 3 Drawing Sheets

CLEANING APPARATUS

CROSS-REFERENCE TO RELATED APPLICATIONS

Figure 1:
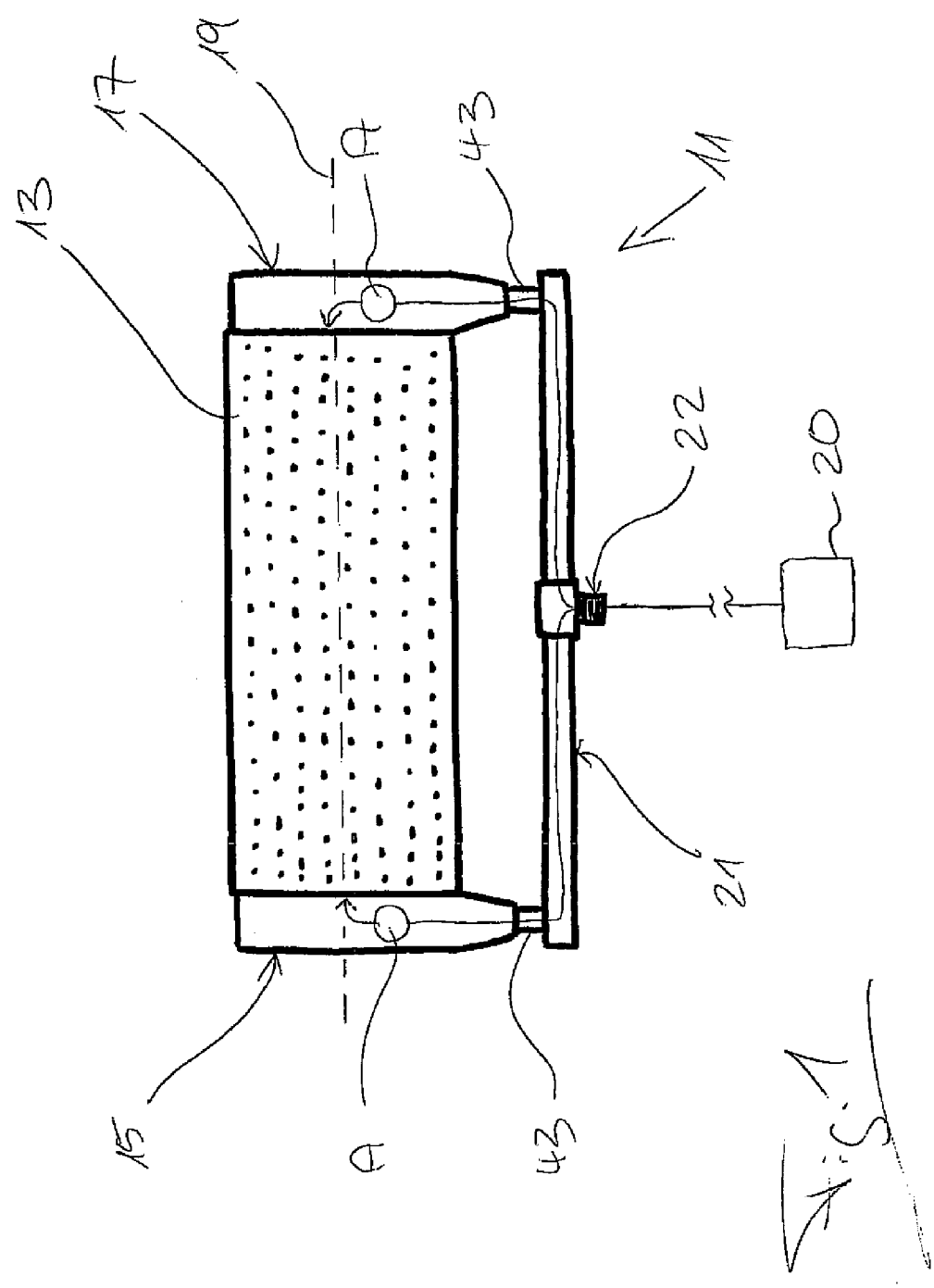

This application claims priority of German Patent Application No. 10 2010 018 011.4 files Apr. 23, 2010.

The invention relates to a cleaning apparatus, in particular for cleaning solar installation surfaces or photovoltaic installation surfaces, having a carrier, at least one cleaning roller rotatably supported at the carrier and a rotary drive for the cleaning roller.

Such cleaning apparatus are generally known, with an electric drive being provided to set the cleaning roller into rotation. The costs and inherent weight of such an apparatus are, however, relatively high so that they are basically not particularly suitable either for private households or for cleaning solar installation surfaces or photovoltaic installation surfaces, which are as a rule inclined, on building roofs.

It is the object of the invention to provide a cleaning apparatus of the initially named kind which can be manufactured inexpensively with a reliable operation and which has an inherent weight which is as low as possible.

This object is satisfied by the features of claim 1.

In accordance with the invention, the rotary drive of the cleaning apparatus is designed as a fluid drive in which the flow of a cleaning fluid supplied to the cleaning roller for cleaning purposes is converted into a drive movement for the cleaning roller.

An additional drive of any kind for the cleaning roller, in particular an electric motor, can be dispensed with by the invention. The cleaning apparatus in accordance with the invention can hereby be manufactured inexpensively and with a low inherent weight.

The invention additionally relates to the use of two fluid drive units of dishwashing brushes as a rotary drive for a cleaning roller rotatably supported at a carrier, wherein the two fluid drive units are provided with different rotational senses and are otherwise designed with the same construction. The two fluid drive units are preferably used as a rotary drive simultaneously effect in the operation of both end faces of the cleaning roller.

In accordance with a preferred embodiment, the rotary drive is designed in accordance with the principle of a fluid drive for a dishwashing brush. Dishwasher brushes with a fluid drive are generally known. The effective surface of such a dishwasher brush, said effective surface being provided e.g. with a bristle arrangement, is formed by the flat side of a rotating disk which can be set into rotation by means of the fluid. A cleaning roller is now particularly not provided at the end face, but rather on its peripheral side with a bristle arrangement or with another piece of equipment suitable for cleaning. It has, however, been recognized by the inventor that the principle of a fluid drive known from a dishwasher brush can also be utilized for the rotary drive of a cleaning roller if the cleaning roller is coupled at the end face to the rotary drive of the dishwasher brush. The rotationally driven cleaning disk of a dishwasher brush is therefore replaced with a cleaning roller, while simultaneously the "end-face" bristle arrangement of the working disk are replaced with the bristle arrangement of the cleaning roller on the peripheral side.

In accordance with a further preferred embodiment of the invention, the rotary drive is a component of the carrier. The rotary drive can hereby simultaneously be used for holding the cleaning roller.

The rotary drive is preferably designed to hold the cleaning roller at least one end face, preferably at both end faces.

The carrier can in particular be designed as a fork having tines formed by the rotary drive for holding the cleaning roller, with the rotary drive preferably including two drive units which each form a tine.

Provision is furthermore preferably made that the rotary drive is simultaneously effective in the region of both end faces of the cleaning roller.

Provision can be made in a further embodiment of the invention that the rotary drive includes two drive units provided with different rotational senses and otherwise designed with the same construction.

The invention therefore makes it possible in a preferred embodiment to set the cleaning roller into rotation simultaneously at both end faces by means of conventional fluid drives, with these drive units simultaneously serving for the holding and for the rotational supporting of the cleaning roller. A cleaning apparatus in accordance with the invention can hereby be realized extremely inexpensively and with a relatively small inherent weight without having to accept compromises in reliability and functional capability. Known fluid drives are easily in a position to provide a sufficiently high drive force even in the low-pressure range of, for example, up to approximately 5 bar. High rotational speeds of several 1,000 revolutions per minute can be realized using known fluid drives. A rotational speed suitable for the cleaning roller in accordance with the invention, for example, can be derived from this by means of a transmission arranged downstream. Such transmissions are used in known dishwasher brushes.

Since, on the use of known fluid drives for dishwasher brushes at the two end faces of the cleaning roller, these fluid drives are arranged with effective sides mutually facing one another, it is necessary that the two drive units have different rotational senses. The rotational sense of such fluid drives can be realized by a conversion associated with only a small effort so that the manufacturing costs do not substantially increase if the fluid drives to be used are not anyway already available in both rotational sense variants.

With a correspondingly stable design of the carrier and, optionally, of the rotary drive forming a component of the carrier, e.g. in the form of two drive units coupled to the cleaning roller in the manner of tines of a fork at the end face, it may be sufficient if the cleaning roller is only held by the rotary drive. Alternatively or additionally, transverse connections can be provided which in particular pass through the cleaning roller. The "tines" of the holding or carrier fork are, for example, connected to one another by such transverse connections in the region of the free ends or in a transverse holder present between the free ends at the base of the tines to give the carrier a respective desired stability or strength in this manner.

If more than one drive unit is provided for the rotary drive of the cleaning roller, provision can then be made in accordance with a further development of the invention that the carrier includes a holder for the drive unit which preferably extends substantially parallel to the axis of rotation of the cleaning roller and which is formed as a common fluid supply for the drive unit.

The carrier can thus form a component of the fluid supply and vice versa.

In accordance with a further development of the invention, the rotary drive, in particular each drive unit, is formed to supply the cleaning fluid to the interior of the cleaning roller at the end face. Additional measures for supplying the cleaning fluid into the interior of the roller are consequently not required in this respect. The outlet of the cleaning fluid through outlet openings formed in the roller jacket can therefore be realized in a comparatively inexpensive and simple manner.

Provision can in particular be made that the rotary drive, in particular each drive unit, includes a work space to which the fluid is supplied and in which the fluid flow is converted into the drive movement, wherein the work space communicates with the interior of the cleaning roller. Provision is consequently made in this respect that kinetic energy for the rotary drive of the cleaning roller is first withdrawn from the cleaning fluid, whereupon the cleaning fluid is supplied to the interior of the cleaning roller in a suitable manner via the work space in which this energy transfer takes place in order subsequently to be output to the outside in the respective manner defined by the design of the cleaning roller.

Advantageous embodiments of the invention are also set forth in the dependent claims, in the description and in the drawings.

Figure 2:
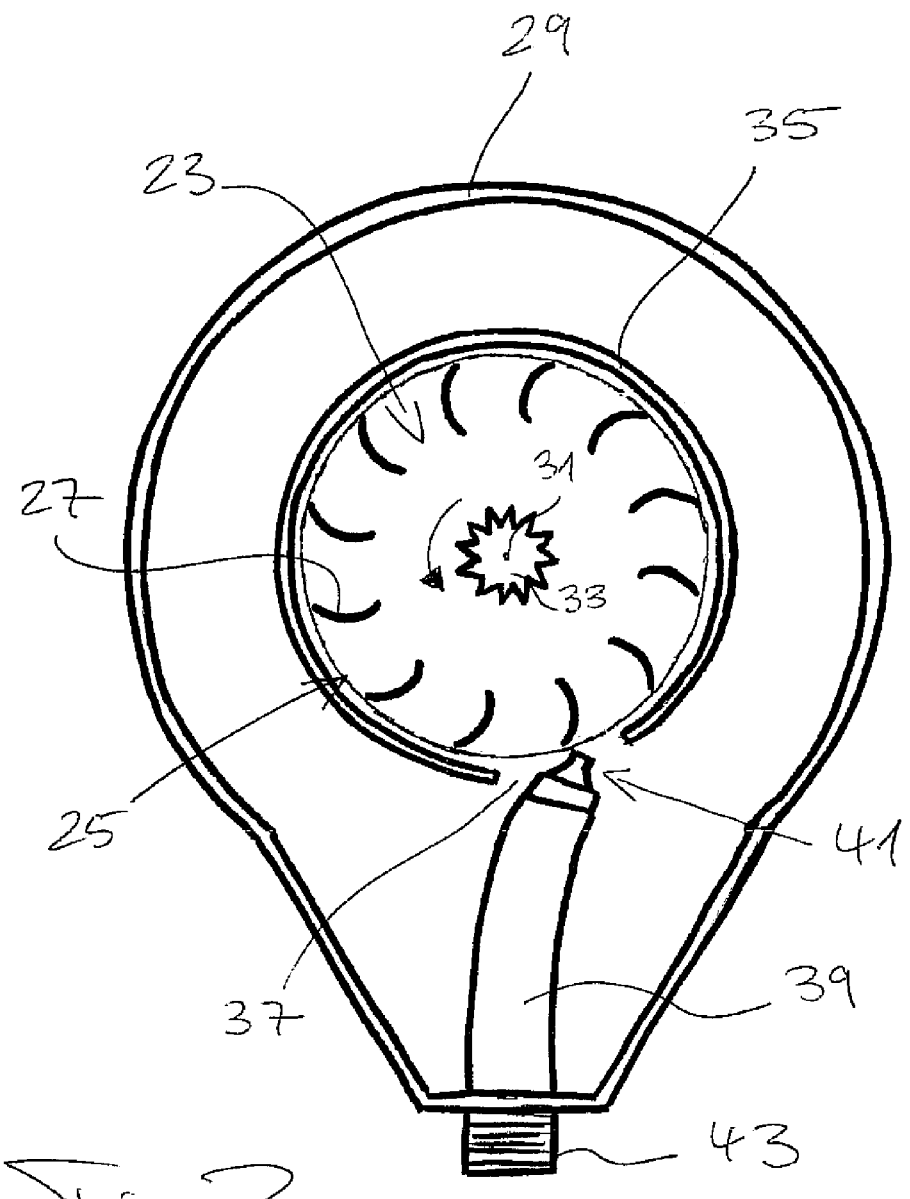
Figure 3:
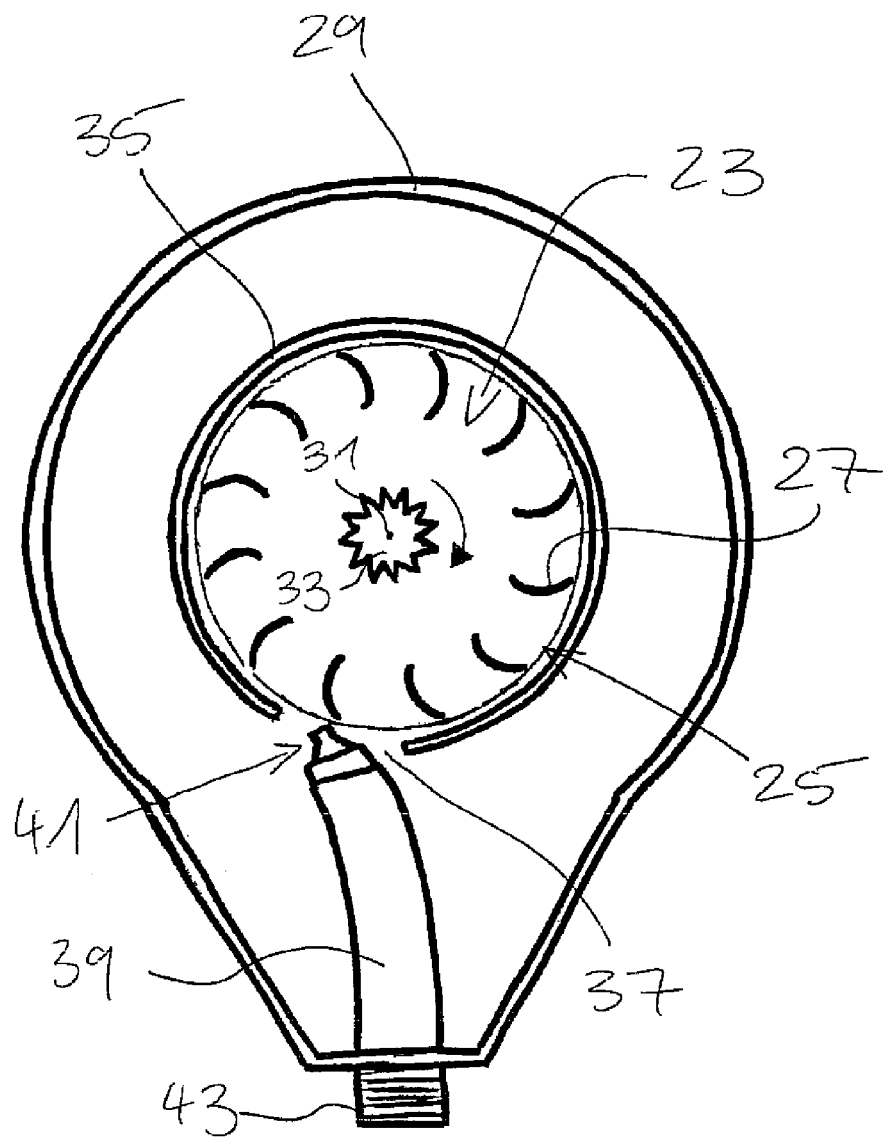

The invention will be described in the following by way of example with reference to the drawing. There are shown:

FIG. 1 schematically, an embodiment of a cleaning apparatus in accordance with the invention;

FIG. 2 schematically, the basic structure of a fluid drive unit such as can be used for a cleaning apparatus in accordance with the invention; and FIG. 3 a fluid drive unit in accordance with that of FIG. 2 with an opposite rotational sense.

The cleaning apparatus in accordance with the invention shown in FIG. 1 includes a cylindrical cleaning roller which is provided at its peripheral surface with a piece of equipment tailored to the respective cleaning purpose, for example with a bristle arrangement. In addition, outlet openings for a cleaning fluid, in particular water, are provided in the roller jacket which e.g. carries the bristle arrangement.

The holder and rotary drive of the cleaning roller 13 take place in this embodiment by two drive units 15, 17 which will be looked at in more detail in the following. These drive unit 15, 17 simultaneously serve as the fluid supply and are connected for this purpose via connections 43 to a common holder 21 which extends parallel to the axis of rotation 19 of the cleaning roller 13. Together with the holder 21, the two chive units 15, 17 form a carrier 11 for the cleaning roller 13.

The holder 21 is in particular connectable to a commercial high-pressure cleaner 20 via a connection 22 so that the cleaning apparatus in accordance with the invention is also interesting for domestic households.

The flow path of the cleaning fluid through the holder 21 and through the chive units 15, 17 into the interior of the cleaning roller 13 is indicated by the arrows in FIG. 1. It is indicated in each case by "A" in the drive units 15, 17 that the cleaning fluid carries out work there to the extent that kinetic energy is removed from it in a turbine explained below in connection with FIG. 2 in order hereby to realize a rotary drive of the cleaning roller 13.

The drive units 15, 17 in each case in this respect satisfy a threefold function in that they hold and rotatably support the cleaning roller 13, provide the supply of the fluid into the interior of the clearing roller 13 and additionally realize the rotary drive for the cleaning roller 13.

As mentioned in the introduction part, the holder and rotary support of the cleaning roller 13 can be provided solely by the drive units 15, 17 so-to-say forming the "tines" of a carrier 11 which is fork-like overall. The holding and/or support function for the cleaning roller 13 can, however, at least partly also be realized in another manner, for example by means of transverse braces which pass through the cleaning roller 13 and which provide the required or the additional stability or strength. It is, however, possible, with a correspondingly stable design of the transverse carrier 21 to hold the cleaning roller 13 only by means of the two drive units 15, 17 engaging at the end face and to support it about the axis of rotation 19 with respect to the rotation.

The diameter of the cleaning roller 13 is, for example, at around 200 mm, which has been found in particular to be especially suitable in particular for the cleaning of solar installation surfaces or photovoltaic installation surfaces. Different working widths, i.e. dimensions of the cleaning roller 13 along its longitudinal axis 19, can be realized without problem by the described structure of the cleaning apparatus, said working widths being, for example, between approximately 500 mm and 1000 mm. A matching of the cleaning apparatus to the usual field sizes of solar installations or photovoltaic installations can hereby take place in an advantageous manner. Furthermore, for example with a sufficient length of the holder 21, an adjustability of the two drive units 15, 17 engaging at the end face provided in the longitudinal direction can be provided which serves to be able to receive cleaning rollers 13 of different lengths with one and the same apparatus.

FIG. 2 shows the basis structure of a generally known dishwasher brush.

A drive disk 25 is rotatably supported about an axis of rotation 31 in a housing part 29 open at one side. The drive disk 25 is located in a work space 23 which is bounded in the axial direction by the housing part 29 and which is bounded in the radial direction by a peripheral wall 35 in which an opening 37 is formed.

Vanes 27 are formed at the drive disk 25 which are acted on by means of the cleaning fluid which is supplied from a line section 39 which bears a nozzle 41 at its free end. The line section 39, and thus the drive unit, can be connected via a connection 43 to a fluid source, in particular in the manner shown in FIG. 1 within the framework of a cleaning apparatus in accordance with the invention.

The drive disk 25 is rotationally fixedly provide with a sprocket 33 in the embodiment shown which is provided at the inlet side of a transmission arrangement, not shown. At the outlet side, this transmission arrangement is connected to the dish brush or to a carrier of the dish brush, which does not need to be looked at individually in any more detail here since such dish brushes are generally known. A single or multiple stepping down of the input speed of the drive disk 25, which can amount to several 1,000 revolutions a minute, can take place by the transmission arrangement.

In accordance with the invention, it is no longer the dishwasher brush or its carrier which is set into rotation by means of the sprocket 33 and the connected transmission arrangement, but the cleaning roller 13 (cf. FIG. 1) is coupled at the end face to the output of the transmission arrangement. The connecting of the cleaning roller 13 to the two drive units 13, 17 takes place in each case such that the cleaning fluid can move from the drive space 23 at least in a predominant portion only into the interior of the cleaning roller 13 in order to be able to exit in a predetermined manner the outlet openings provided in the roller jacket.

As can in particular be seen from a comparison of FIGS. 2 and 3, a fluid drive having an opposite rotational sense, such as is required for the respective other end face of the cleaning roller 13, can be realized simply in that the opening 37 and the orientation of both the line section 39 provided with the nozzle 41 and the vanes 27 are modified so that a rotation of the drive disk 25 in the clockwise sense (FIG. 3) results. In other words, the drive unit of FIG. 3 is formed as the mirror image of the drive unit shown in FIG. 2 with respect to the rotational sense. Such a modification can be realized in a simple and inexpensive manner.

Since the anyway already existing drive units additionally satisfy a plurality of functions in accordance with the invention, costs and weigh of the cleaning apparatus can be kept surprisingly low in an advantageous manner. An inexpensive and light cleaning apparatus can thus be realized so-to-say "with the simplest means" while using known components, said cleaning apparatus being suitable for the cleaning of solar installation surfaces and photovoltaic installation surfaces provided on inclined roofs due to the low inherent weight and being especially interesting for domestic households due to the relatively low manufacturing costs.

The invention claimed is:

1. A cleaning apparatus, comprising
   a carrier;
   at least one cleaning roller rotatably supported at the carrier; and
   a rotary drive for the cleaning roller,
   wherein the rotary drive is designed as a fluid drive in which the flow of a cleaning fluid supplied to the cleaning roller for cleaning purposes is converted into a drive movement for the cleaning roller, and
   wherein the rotary drive holds the cleaning roller only at at least one end face and wherein said rotary drive forms the sole support for said cleaning roller.

2. A cleaning apparatus in accordance with claim 1, wherein the rotary drive is designed in accordance with the principle of a fluid drive for a dishwasher brush.

3. A cleaning apparatus in accordance with claim 1, wherein the rotary drive is a component of the carrier.

4. A cleaning apparatus in accordance with claim 1, wherein the carrier is designed as a fork with tines formed by the rotary drive for holding the cleaning roller.

5. A cleaning apparatus in accordance with claim 4, wherein the rotary drive includes two drive units which each form a tine.

6. A cleaning apparatus in accordance with claim 5, wherein the rotary drive includes two drive units provided with different rotational senses and otherwise designed with the same construction.

7. A cleaning apparatus in accordance with claim 5, wherein the carrier includes a holder extending substantially parallel to the axis of rotation of the cleaning roller for drive units of the rotary drive, said holder being designed as a common fluid supply for the drive units.

8. A cleaning apparatus in accordance with claim 5, wherein each drive unit is designed to supply the cleaning fluid to the interior of the cleaning roller at the end face.

9. A cleaning apparatus in accordance with claim 5, wherein each drive unit includes a work space to which the fluid is supplied and in which the fluid flow is converted into the drive movement, wherein the work space communicates with the interior of the cleaning roller.

10. A cleaning apparatus in accordance with claim 1, wherein the rotary drive is effective simultaneously in the region of both end faces of the cleaning roller.

11. A cleaning apparatus in accordance with claim 1, wherein the rotary drive is designed to supply the cleaning fluid to the interior of the cleaning roller at the end face.

12. A cleaning apparatus in accordance with claim 1, wherein the rotary drive includes a work space to which the fluid is supplied and in which the fluid flow is converted into the drive movement, wherein the work space communicates with the interior of the cleaning roller.

13. A cleaning apparatus in accordance with claim 1, wherein said cleaning apparatus is an apparatus for cleaning solar installation surfaces or photovoltaic installation surfaces.

* * * * *